July 12, 1966  R. L. VERREAULT  3,260,335
CONVEYOR TRANSFER ASSEMBLY
Filed Jan. 21, 1965  5 Sheets-Sheet 1

INVENTOR
ROBERT L. VERREAULT
BY Semmes & Semmes
ATTORNEYS

INVENTOR
ROBERT L. VERREAULT
BY Semmes & Semmes
ATTORNEYS

July 12, 1966  R. L. VERREAULT  3,260,335
CONVEYOR TRANSFER ASSEMBLY
Filed Jan. 21, 1965  5 Sheets-Sheet 4

INVENTOR
ROBERT L. VERREAULT

BY Semmes & Semmes
ATTORNEYS

July 12, 1966 R. L. VERREAULT 3,260,335
CONVEYOR TRANSFER ASSEMBLY
Filed Jan. 21, 1965

INVENTOR
ROBERT L. VERREAULT
BY Semmes & Semmes
ATTORNEYS

United States Patent Office 3,260,335
Patented July 12, 1966

3,260,335
CONVEYOR TRANSFER ASSEMBLY
Robert L. Verreault, River Road, Lewiston, Maine
Filed Jan. 21, 1965, Ser. No. 426,730
3 Claims. (Cl. 193—36)

The present invention relates to a conveyor transfer assembly, particularly an assembly for pivoting a work piece pallet transversely aside from an endless conveyor line and returning the pallet to said conveyor line as an interim work operation is completed.

Numerous previous inventors have devised elaborate mechanical means for pivoting work pieces or pallets out of a continuously advancing main conveyor line. However, the complexity of these mechanisms, as well as their expense, has precluded their ready adaptability to a manufacturing operation wherein a great deal of separate work operations are to be performed upon individual units moving in great volume. For example, in shoe manufacture there are a plurality of trimming, glueing, spraying, tacking, sewing and like operations to be performed. Heretofore, the shoe pieces have been advanced on individual pallets moving in a conveyor line. These pallets were attacked manually by various workmen grabbing shoe pieces off of the pallets as they passed on a main conveyor line. This random operation, of course, has not been entirely satisfactory. According to the present invention, there is provided a pool cradle which is supported both beneath the conveyor main line and to one side thereof. As a work piece pallet arrives over the pool cradle, the cradle is pivoted upwardly beneath the pallet and through the conveyor line so as to lift and angle the pallet for lateral gravity feed to one side of the conveyor. Thus, the pallet to be worked upon is removed from the conveyor main line and may remain aside in the work pool until the individual operator's work is completed. Then, the pallet is advanced by the individual operator onto a return cradle which lifts the pallet for gravity feed back onto the advancing conveyor. Microswitch controls are employed to activate the transfer assembly upon arrival of a pallet and to prevent clogging of the crade as the pool is filled.

Accordingly, it is an object of invention to provide a simple, rugged transfer assembly in a conveyor.

Yet, another object of invention is to provide means for laterally transferring a work piece pallet from an advancing endless conveyor.

Another object of invention is to provide in a endless conveyor system both a work piece pallet removal assembly and a work piece pallet return assembly.

Yet, additional objects of invention will become apparent from the ensuing specification and attached drawings wherein.

Figure 1:
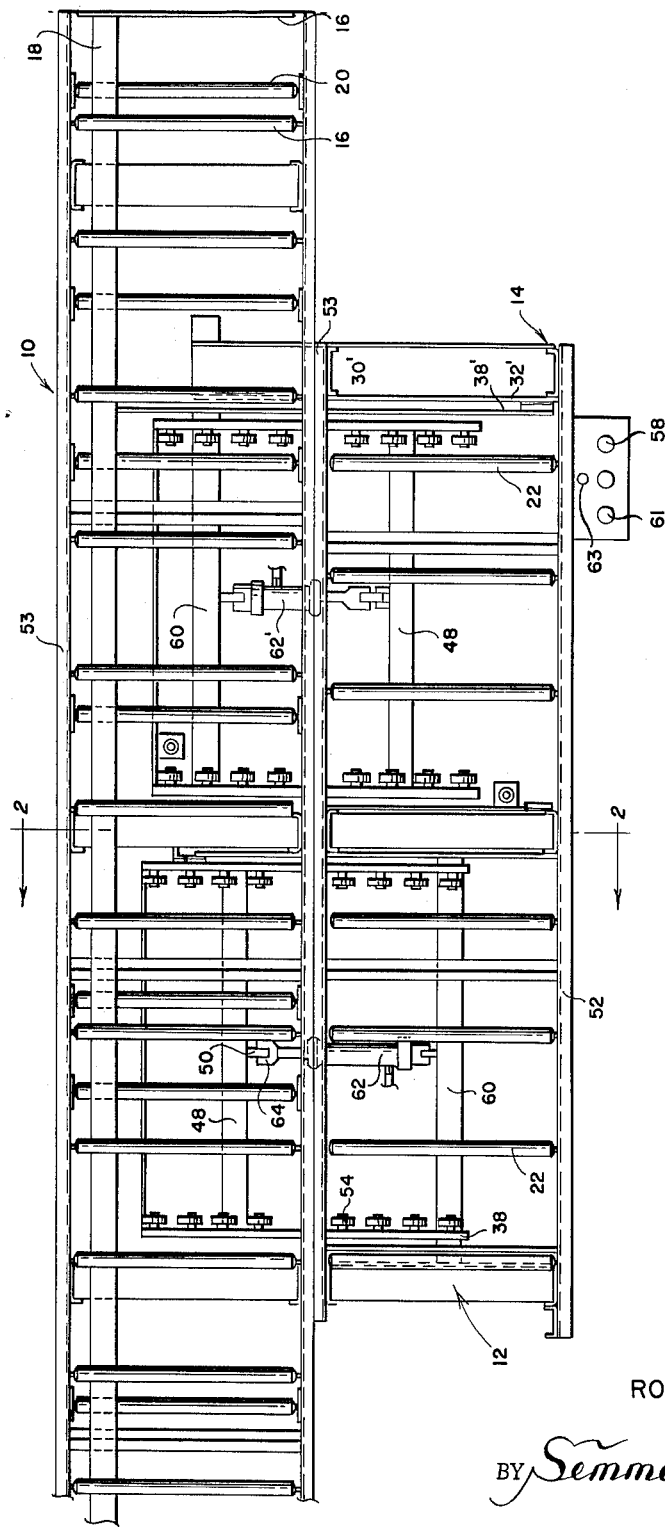
FIG. 1 is a top plan, partially fragmentary, showing the pool and return pivoting cradle assemblies positioned both beneath and to one side of the main conveyor line.
Figure 2:
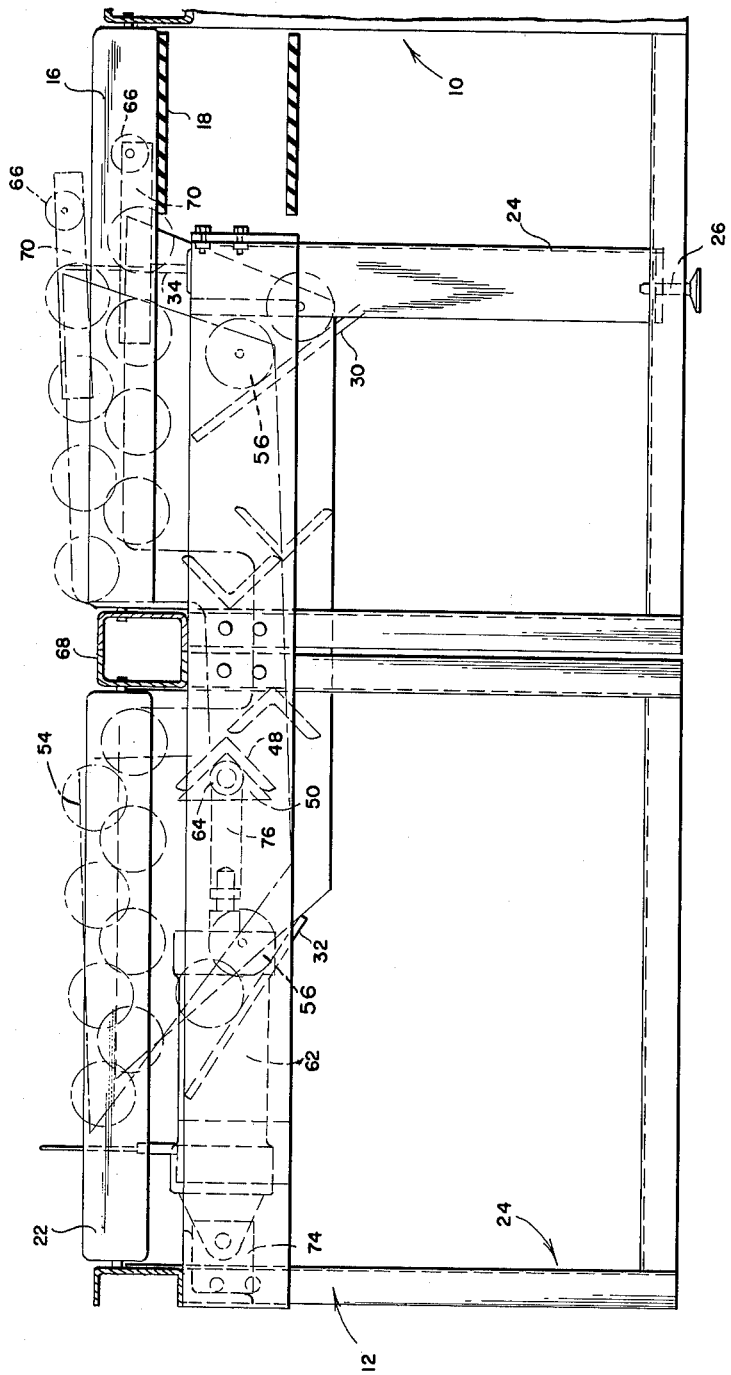
FIG. 2 is a sectional view, partially in phantom taken along section line 2—2, of FIG. 1.
Figure 3:
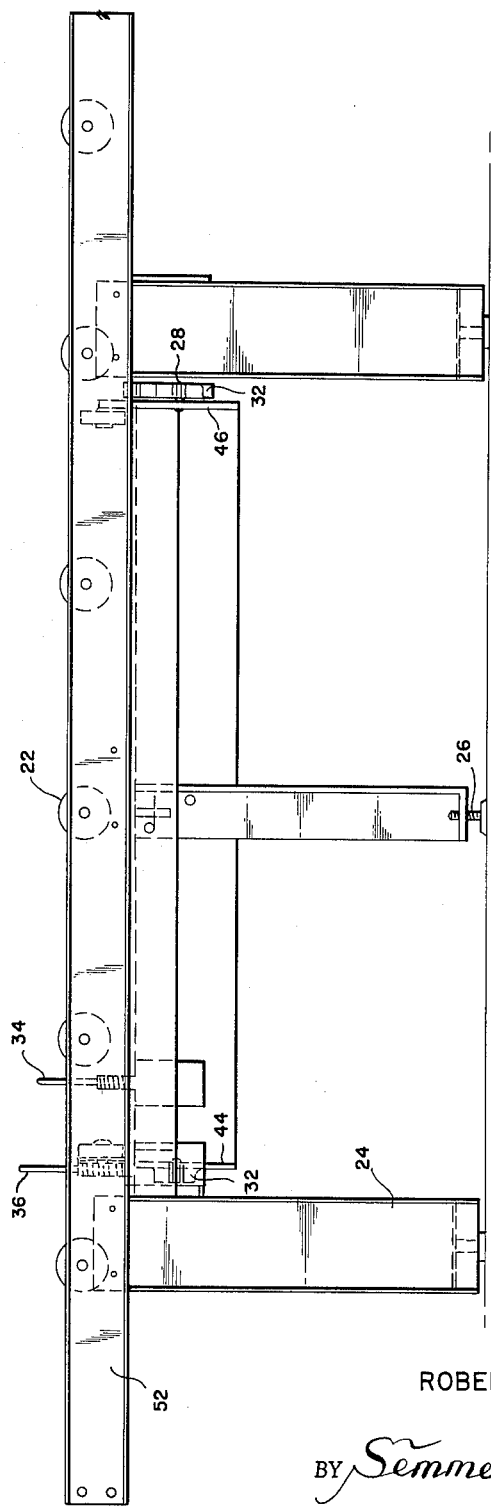
FIG. 3 is a front elevation of the return pool cradle.

In FIG. 1 there is shown a main conveyor line 10, a pool transfer station 12 and a return transfer station 14. As also indicated in FIG. 2, main conveyor line 10 is composed substantially of driving rollers 16 supported above drive belt 18 which is urged against roller 16 by pressurizing rollers 20. Pool transfer station 12 and return transfer station 14 are defined by upstanding legs 24, front rail 52 and back rail 53. Level adjusting screws 26 may be secured to one or more of the legs 24.

Figure 4:
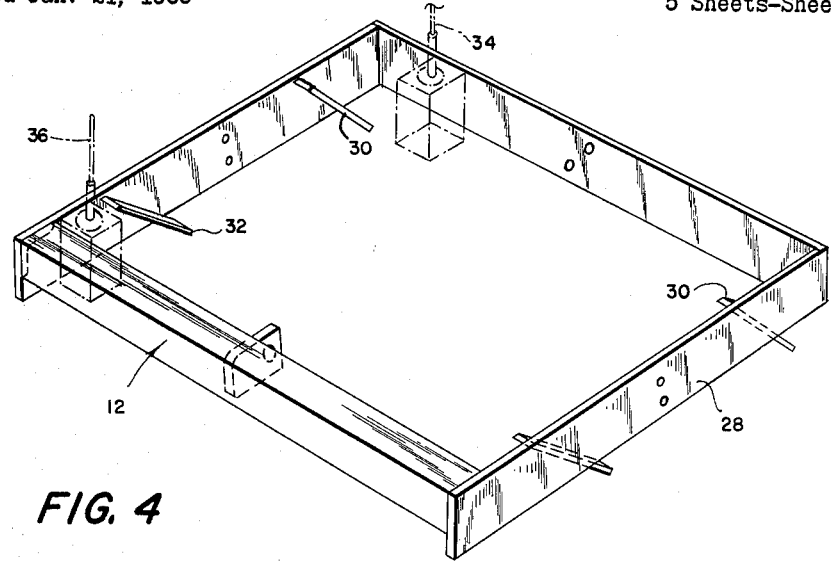
FIG. 4 is an enlarged perspective of the pool frame with inclined tracks angled away from the main conveyor line.
Figure 5:
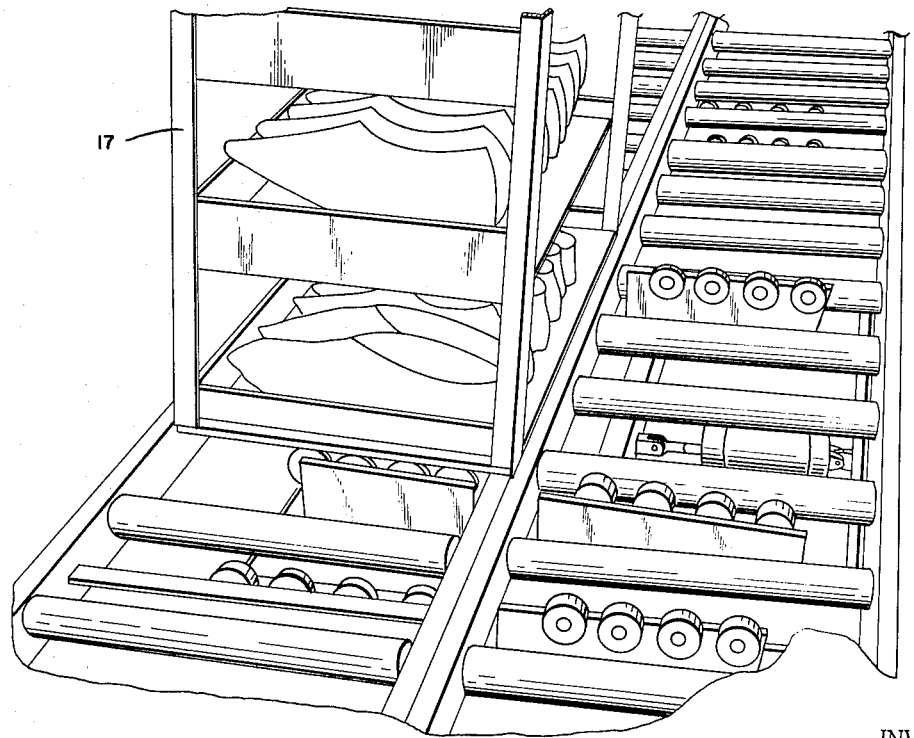
FIG. 5 is a perspective view of a work piece pallet in process of being pivoted upwardly for gravity feed from the main conveyor line down into the pool.

As particularly illustrated in FIG. 4, a pool frame 28 is supported beneath main conveyor 10 and extends laterally thereof. Frame 28 has a plurality of inner tracks 30, steeply inclined away from the main conveyor 10 and outer tracks 32 gradually inclined away from main conveyor 10. A transfer microswitch 34 may be positioned within the conveyor end of frame 28 so as to activate the hydraulic jack 62 for pivoting of cradle 38 upon arrival of a work transfer pallet 17 above frame 28. Similarly, a pool transfer stop switch 36 may be employed on the outside corner of pool frame 28 so as to prevent actuation of this pivoting mechanism, as the pool is filled with a work piece pallet.

Figure 6:
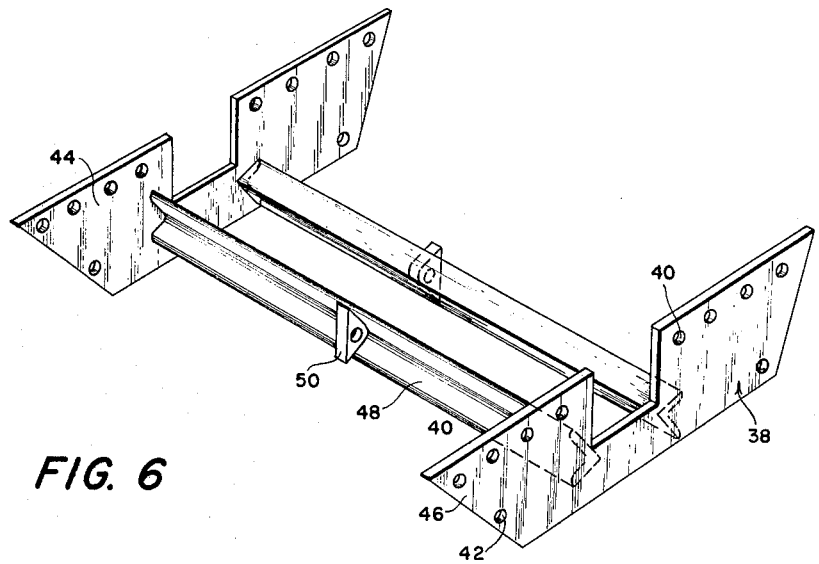
FIG. 6 is an enlarged perspective of a pool cradle with wheels removed.

In FIGS. 2 and 6, cradle 38 is more particularly illustrated as comprising end pieces 46 and 44 having idler roller holes 40 and steel bearing roller holes 42. As illustrated in FIGS. 1 and 2, plastic idler rollers 54 are supported at the top of the cradle whereas bearing rollers 56 are supported at the bottom of the cradle so as to run upon inclined tracks 30 and 32. An arm extension 70 is secured to the inside of end pieces 46 and 44 so as to support a smaller idler roller 66 above the advancing conveyor belt 18.

A control box 58, illustrated in FIG. 1, may contain the necessary electrical switching actuators 61 for both the pool and return cradles, and indicator light 63, as may be desired.

In FIG. 2 the pivoting action of the pool cradle is indicated by dotted lines. An hydraulic cylinder 62 is secured pivotably by a bracket 74 to frame 12 or any type of front rail. The cylinder arm 76 is secured by clevis means 64 to a lug 50 which is supported in the pool cradle angle iron strut 48. Upon withdrawal of arm 76 the entire cradle is caused to travel to the position of the dotted lines upon tracks 30 and 32. Inasmuch as track 30 is steeper than track 32, the portion of the cradle positioned beneath conveyor 10 is thus pivoted upwardly through the plane of the conveyor, above driving rollers 16. Simultaneously, that portion of the cradle extending beneath the pool rollers 22 and laterally to one side of conveyor roller 16 is pivoted upwardly only to a lesser extent. Consequently, a conveyor pallet indicated in dotted lines is, by such pivoting, gravity fed from the power conveyor roller bars 16 onto the idler rollers 22 in the pool.

Figure 7:
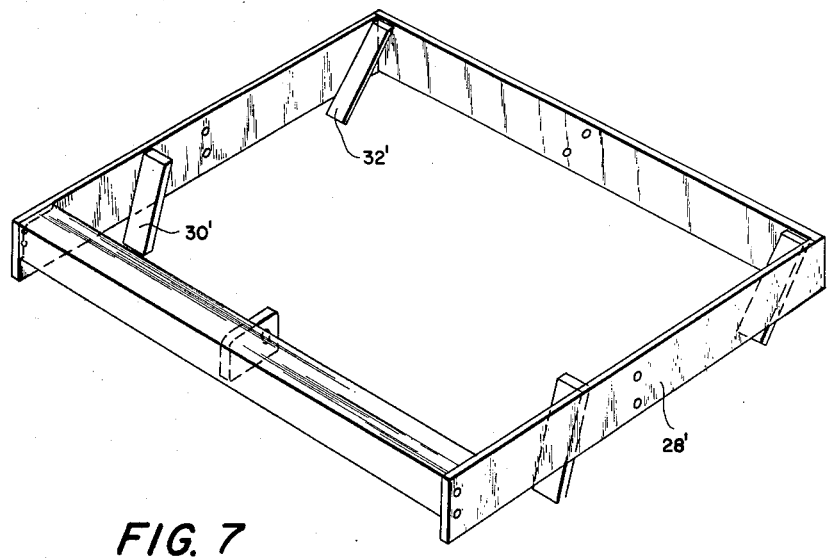
FIG. 7 is a perspective of a return frame, the inclined tracks being angled towards the main conveyor line, instead of away from the conveyor line as in FIG. 4.

The individual operator is then free to perform work on the pallet supported items. As this work is completed and it is desired to return the work piece pallet onto the conveyor, the pallet is shifted longitudinally on idler rollers 22 to the return cradle 38', whereupon the converse pivoting operation is performed. Return frame 28', illustrated in FIG. 7, has its tracks 30' and 32' pivot the outer end of the cradle upwardly above the end which is supported beneath conveyor 10. Thus, there is a converse gravity feed of the pallet onto the conveyor assembly.

Of course, pneumatic or other means as well as hydraulic, may be employed to pivot the cradles as desired. Also, the conveyor line itself may have various types of switches limiting longitudinal advance of the pallets on the conveyor main line until a preceding pallet is transferred to one side into the pool.

Manifestly, various types of pivoting cradles may be employed and the structure of the pivoting elements themselves may be varied without departing from the spirit and scope of invention as defined in the subjoined claims.

I claim:
1. In a conveyor of the type supporting a plurality of spaced rollers within a pallet conveying plane, a conveyor transfer assembly supported within said conveyor and comprising:
   (A) a frame positioned beneath said conveying plane and extending laterally thereof;
   (B) a pool cradle supported in said frame and having a plurality of track and engaging wheel elements transversely aligned with respect to said conveyor spaced rollers, said cradle being pivotable transversely through said conveying plane to a position above said plane so as to gravity feed laterally a work piece pallet out of said conveying plane; a return cradle adjacent said pool cradle and having track and engaging wheel elements transversely aligned so as to pivot said return cradle to a point above yet laterally spaced from said conveying plane so as to return a pallet onto said conveying plane;
   (C) means pivoting said pool and return cradles;
   (D) a plurality of idler rollers extending laterally and in parallel with said conveyor rollers, said idler rollers being positioned above said pool cradle and above said return cradle so as to longitudinally advance a work load pallet parallelly with said conveying plane;
   (E) a transfer limit switch positioned at the conveying plane end of said pool cradle and extending said conveying plane, so as to pivot said pool cradle upon advance of a work piece pallet above said pool cradle; and
   ((F) a pool load switch positioned at the pool end of said pool cradle apart from said conveying plane and extending upwardly into said pool so as to prevent pivoting of said pool cradle while a work piece pallet is supported in said pool cradle.

2. A conveyor transfer assembly of the type used adjacent an endless pallet conveyor having a plurality of spaced rollers comprising:
   (A) a pool frame supported beneath said conveyor and extending laterally thereof and having a first series of inclined tracks directed to one side of said conveyor;
   (B) a pivotable pool cradle supported upon bearing rollers guidable in said inclined tracks, said cradle having upper idler rollers transversely positioned with respect to said spaced rollers in said conveyor;
   (C) pivoting means connected to said frame at one end and said cradle at the other end so as to pivot said cradle upwardly at its conveyor end upon said inclined tracks, so as to lift a work piece pallet onto said transversely disposed idler rollers and above said conveyor, enabling travel of said pallet transversely from said conveyor to a position lateral thereof;
   (D) a return frame positioned adjacent said pool frame and supported beneath said conveyor and extending laterally thereof and having a plurality of inclined tracks directed towards said conveyor;
   (E) a return cradle supported within said return frame upon roller elements positioned in said track elements, said cradle having upper idler rollers transversely positioned with respect to said spaced rollers and said conveyor, so as upon pivoting to lift a work piece pallet for gravity feed back into the conveyor;
   (F) return cradle pivoting means connected to said return frame at one end and said return cradle at the other end so as to pivot said cradle upwardly at its pool end at one side of said conveyor upon said inclined tracks;
   (G) a plurality of idler rollers positioned parallelly to said conveyor rollers above said pool and return cradle so as to move longitudinally a work piece pallet from said pool cradle to said return cradle; and
   (H) a transfer limit switch positioned at the conveyor end of said pool cradle and extending upwardly into said conveying plane so as to actuate said pivoting mechanism upon arrival of a work piece pallet above said pool cradle.

3. A conveyor transfer assembly as in claim 2, including a pool limit switch positioned at the pool end of said pool cradle and extending upwardly into said pool so as to prevent actuation of said pool cradle pivoting means as said pool cradle is loaded with a pallet.

References Cited by the Examiner

UNITED STATES PATENTS

| | | | |
|---|---|---|---|
| 1,549,499 | 8/1925 | Parker. | |
| 2,360,661 | 10/1944 | Eddy et al. | 193—36 |
| 3,058,565 | 10/1962 | Byrnes | 193—36 |
| 3,173,554 | 3/1965 | Ebbert | 193—36 X |

EVON C. BLUNK, *Primary Examiner.*

SAMUEL F. COLEMAN, A. LEVINE, *Examiners.*